United States Patent [19]

Sienkiewicz

[11] 4,283,024
[45] Aug. 11, 1981

[54] MATERIAL PROCESS MACHINERY

[75] Inventor: Henry R. Sienkiewicz, Stamford, Conn.

[73] Assignee: Spadone Machine Company, Inc., Norwalk, Conn.

[21] Appl. No.: 112,215

[22] Filed: Jan. 15, 1980

[51] Int. Cl.³ ..................... B65H 23/16; B65H 59/36
[52] U.S. Cl. ................................. 242/75.3; 226/195; 242/147 R
[58] Field of Search ................. 242/75.3, 147 R, 47.5, 242/129.1, 129.4, 45, 75.5; 226/195, 44, 45; 28/194

[56] References Cited

U.S. PATENT DOCUMENTS

| | | | |
|---|---|---|---|
| 58,708 | 10/1866 | Wolf | 242/75.3 X |
| 1,483,555 | 2/1924 | Sevigne et al. | 242/75.3 |
| 1,626,409 | 4/1927 | Gwinn | 226/195 X |
| 1,655,631 | 1/1928 | Gordon | 242/75.3 X |
| 2,825,557 | 3/1958 | Jacobsen | 226/195 |
| 3,249,315 | 5/1966 | Peltier | 242/75.3 |

Primary Examiner—Stanley N. Gilreath
Attorney, Agent, or Firm—William G. Rhines

[57] ABSTRACT

This invention relates to devices for maintaining uniform the slack of a continuum of material while it is in process. One embodiment, particularly useful with machinery for wrapping tire-bead chafing strips, comprises an axle-mounted idler roll wherein the axle is supported by a pair of ball bushings mounted one each on support rods. The axes of the rods are parallel and variably inclineable so as to increase selectively the slope of the axes along which the ball bushings are impelled gravitationally, in opposition to the continuum of material as it is looped about and moves past or over the surface of the roll.

3 Claims, 4 Drawing Figures

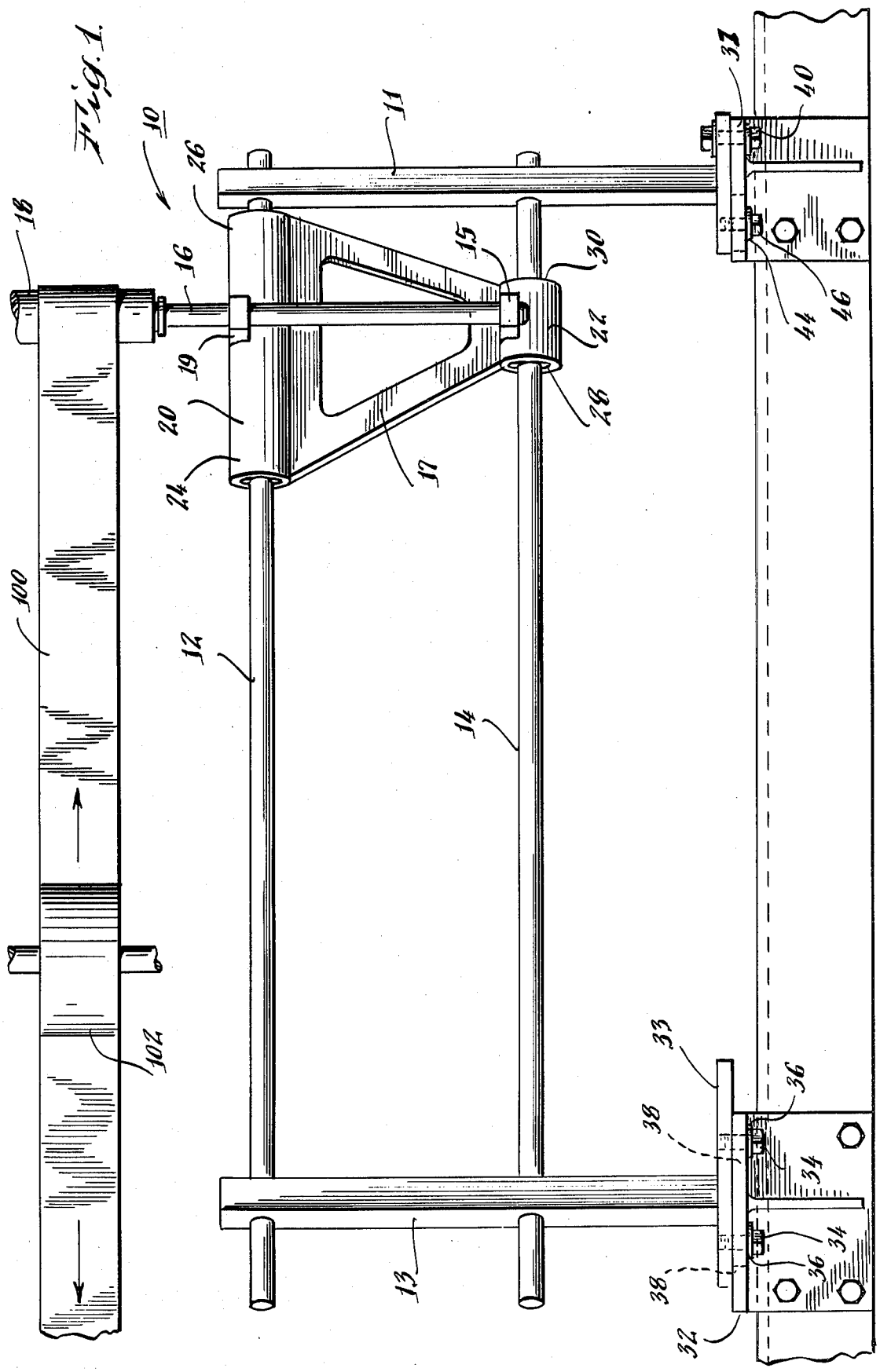

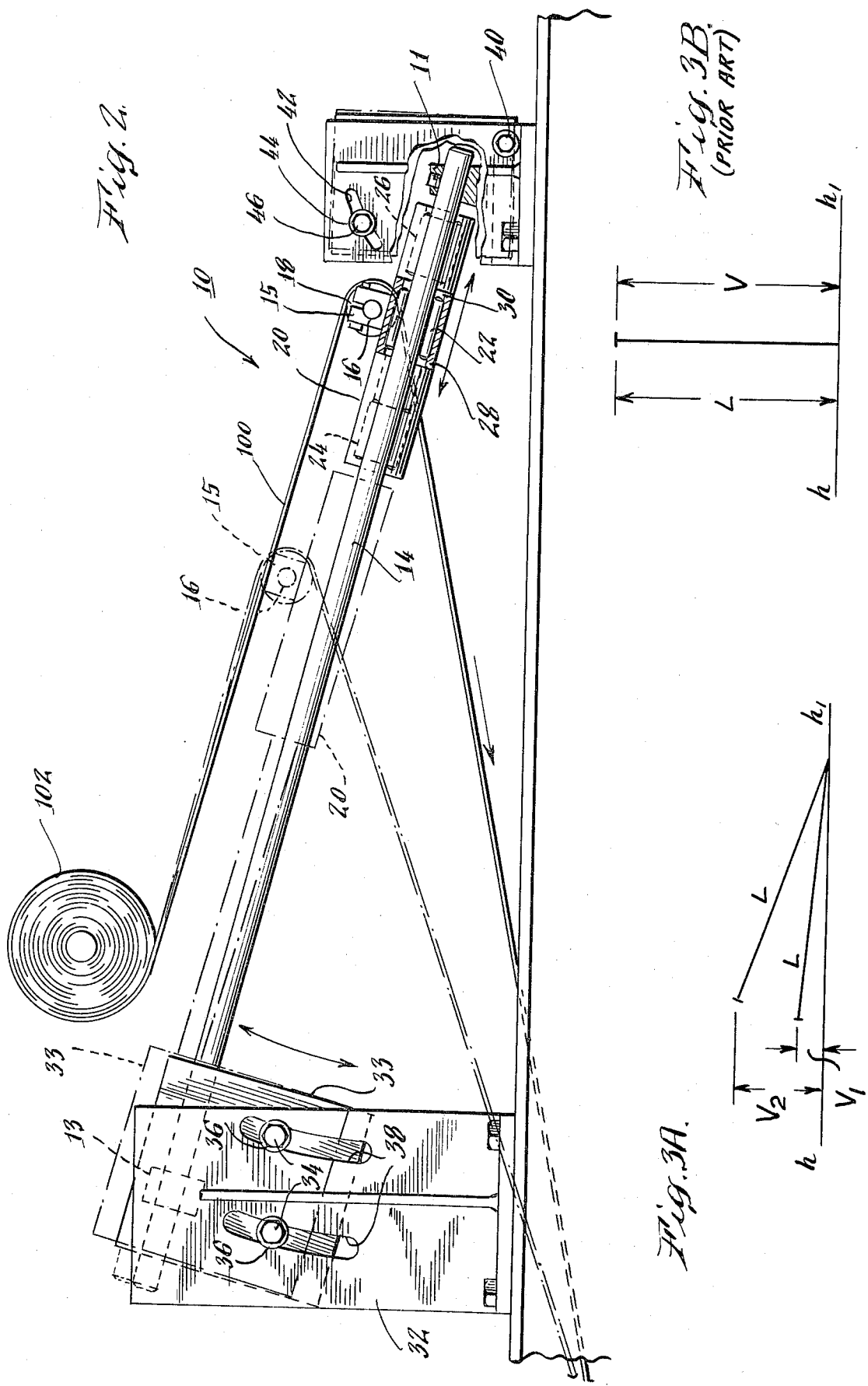

MATERIAL PROCESS MACHINERY

BACKGROUND OF INVENTION

In the field of material process machinery, there are many situations where it is desired to maintain the tension on a continuum of moving material. Thus, for example, in the field of metal wire drawing, it is known to cause wire drawing stock coming from a supply reel to pass through a "dancer" into a wire drawing machine. The dancer, which is a tensioning device, may consist of a pair of sheaves, or pulleys, mounted on axles at the top of a support frame, with a third pulley, optionally weighted and/or spring loaded, positioned therebetween and within guide-tracks. Since the center pulley is free to move up and down in the tracks, the filament of wire may be caused to ride over the tops of the first and second pulleys, and under the middle one, so that the inherent bias of the latter is free to work in opposition to tension variations on the wire. As tension on the wire is increased, the center pulley will move upward in its tracks in response until the point when the tension and the counter-force exerted by the dancer are equal, at which point the upward travel of the center pulley will cease. Until those forces are equalized, the center pulley will continue to travel upward. Thus, the length of the tracks must be sufficient to accomodate the time over which the increased tension occurs, otherwise the tension on the wire will increase sharply when the center pulley reaches the end of its permissable travel at the top of the tracks. Further, through operation of Newton's Third Law, as tension is applied to the wire, the weight and/or spring bias of the central pulley causes the wire to "see" a transient increase in tension as an equal and opposite reaction until the pulley is traveling upward at a velocity sufficient to offset substantially the transient constituent of the increase in tension. Although the wire may be more or less ductile, and some "necking down" may occur as a result, it normally is insignificant in amount, and of no appreciable consequence anyway in view of the ensuing operations (e.g., wire drawing) to which the wire is subjected. Similarly, when the material in process is thread or yarn, substantially the same considerations obtain, so such dancer-type tension devices have also been found to be satisfactory in such applications.

Other tension devices operate on the principle of beam deflection, as by mounting a tension pulley at the end of a wand or beam, and/or on the principle of spring loading with or without weight or beam deflection augmentation. Although with such alternative devices, singly or in combination, the configuration of loading on the continuum of material being processed in response to it being tensioned may be varied, they may also exhibit equal and opposite reaction phenomena of the type experienced with "dancers". Further, such devices typically have a more limited travel displacement path than dancer-type tensioners, and also may have the adverse characteristic of non-linear tension increases as a function of the displacement of the pulley.

Again, such characteristics are tolerable with a number of materials, such as some metal wires or textile yarns, and so, as a practical matter, are acceptable for a wide variety of uses. However, there are a number of applications where it is necessary or desirable to accomodate processing variations without introducing significant tension variations to the material being processed, because the material itself is not capable of tolerating such tensioning. Such materials include those with a low breaking strength, those which are so ductile as to be susceptible to permanent, objectionable, cross-sectional distortion, and those which, although recoverable from tension introduced size and/or dimensional variations when the increased tension is removed, are likely to exhibit objectionable tension induced distortions at a critical stage in processing. Thus, for example, in the field of tire making, the bead wires which form the reinforcement for the tire edges that are juxtaposed to the wheel, are wrapped with so-called "chafing strips" at an early stage in the process of manufacture of a tire. These strips, made from ribbons of unvulcanized rubber, and typically about 2 inches wide and about 1/64 to 1/32 inch thick, are subject to stretching under relatively light tension, with consequent radical narrowing and reductions in thickness of the material. Friction variations in a pay-off mechanism, differing rates of take-up, and changes in the size and/or contour of the surfaces to which the material is being applied, for example, may introduce changes which, if a tensioning device were used, would result in variations in tension on the material being processed. As a result, if application and tension occur simultaneously, significant portions of the tapes may not abut or overlap, or they may produce overlay thicknesses which are not uniform or according to acceptable design limitations.

Accordingly, it is an object of this invention to provide means for stabilizing, within acceptable limits, the configuration of elongated materials in process without significant changes in the tension thereof.

Another object of this invention is to provide such means to so stabilize such material substantially throughout the entire time period over which processing variations occur.

Yet another object of this invention is to provide means for satisfying the foregoing objectives to accomodate materials which are susceptible to significant "necking-down", thickness reductions and/or other cross-sectional distortions while under the influence of variations normally encountered in process.

Still another object of this invention is to provide means for satisfying the foregoing objectives in which the stabilization characteristics may be varied finely over a range of setting.

DESCRIPTION OF INVENTION

Desired objectives may be achieved through practice of the present invention, embodiments of which include a rotatable material support roll about which a moving continuum of material which is to be processed may be positioned in a configuration such that restriction of the flow of material will introduce a force moment on the roll which has a lateral constituent, support means for said roll, and bed means for supporting said support means in easily moveable relationship thereto in response to the introduction to the roll of force moments as aforesaid, said bed means being variably, fixedly inclineable upward with respect to horizontal in the direction toward which said support means moves in response to the introduction of such force moments.

DESCRIPTION OF DRAWINGS

This invention may be understood from the description which follows and from the included drawings in which FIG. 1 is a top view of the embodiment of this invention, FIG. 2 is a side elevation view of an embodiment of this invention shown in FIG. 2; and FIGS. 3A and 3B are schematic renditions of forces relating to embodiments of this invention compared to prior art devices.

DESCRIPTION OF PREFERRED EMBODIMENTS

Referring first to FIG. 1, there is depicted a top plan view of an embodiment of this invention, in the form of a device 10. It includes end frame members 11, 13, supporting and spacing side frame rods 12, 14. Positioned on the rods 12, 14, is a roll support means 17 which includes so-called "ball-bushings" 22, 24, 26. In this instance, the two bushings 24, 26 are positioned on the rod 12, and the other bushing 22 on the other rod 14, so as to impart added positional stability against torque moments of force on the shaft 16 introduced by material passing over the roll 18. As is shown in cross-section in greater detail in FIG. 2, the ball bushing 22 includes circular arrays 28, 30, of balls held in raceways, in the style of ball bearings. The ball bushings 24, 26 are similarly constructed. The bushings 22, 24, 26 thereby afford a readily moveable, low friction contact between the support frame 17 and the associated rods 12, 14. Mounted on the support frame 17 by means of shaft mounting blocks 15, 19, is a support shaft 16, on which is rotatably mounted a roll 18.

As may be seen from FIG. 2, the frame members 13, 11 are welded or otherwise rigidly affixed to adjustment plates 33, 35 which, in turn, are pivotally mounted as hereinafter discribed, to fixed supports such as a machine frame or the support plates 32, 31 respectively. The plate 32 has arcuate slots 38 in each of which is positioned a bolt 34 with an associated washer, by means of which the plate 33 may be moved upward or downward and then secured in position, with respect to a machine frame or other support means. Similarly, the plate 31 includes an arcuate slot 42 in which is positioned a retention bolt 46 with an associated washer 44. The plate 31 also includes a pivot hole in which is positioned a pivot bolt 40, about which the entire assembly may pivot as the plate 33, and therefore the frame member 13 and the ends of the rods 12, 14, are raised or lowered. The plate 31 may also be associated with the side frame or other support of an associated machine so that the device may be selectively and changeably positionally affixed with respect thereto, through operation of the bolt 46.

As will be seen from the foregoing figures and description, in use, a continuum of material 100, such as chafing strip to be applied to a tire bead wire, packaged on a roll 102 or other package, may be positioned about the roll 18 so that as process variations occur to the material 100, the resulting moments of force will cause the associated support frame 17 to move up the incline plane described by the axes of the rods 12, 14. Such an action is against the natural bias supplied by gravity acting on the assembly, tending to propel the frame 17 down the rods 12, 14. However, because of the low friction and/or inertia elements which are operative, the assembly is responsive to changes in speed and/or slack in the material by providing substantially tensionless length adjustment accomodations to moments of force applied to it compared to those which would be experienced, for example, with the "dancer" and other types of tension devices of the prior art. As a result, material such as tire bead chafing tapes, which are very sensitive dimensionally to tension forces, may be kept under acceptably constant dimensional and cross-sectional condition while changes, such as wrapping speeds, configurations, and pay-off resistance, are occuring. Further, the control produced by the device is substantially uniform throughout the entire range of operation of the device, and not subject to variations of the type which occur with tension devices of the spring-loaded or deflection beam type. In addition, since the length of the rods 12, 14 is virtually unlimited, and since a desired capability of such a device must be to accomodate reduced slack while avoiding tension increases over substantial periods of time before stabilization or decreases in slack generation or diminution occur, devices made in accordance with the present invention may be readily adapted to such extended time period requirements.

FIGS. 3A and 3B illustrate the various forces and capabilities which are involved with embodiments of the present invention, as compared to those experienced with prior art devices.

As shown in FIG. 3-A, the vertical gravitational force moments, and therefore the tension producing forces realized with devices in accordance with the present invention may be kept within very low ranges of values $V_1$, $V_2$, well within tolerable limits, with the length L long and constant, by adjustment of the angle at which the frame is inclined with respect to the horizontal h—$h_1$. In contrast, as is shown in FIG. 3-B, in prior art tension devices, where the track is fixed in the vertical position with respect to horizontal h—$h_1$, the anti-tensioned forces are inherently and unavoidably high and, in applications of the type hereinbefore described, prohibitively so.

It will be apparent that this invention may be practiced in a wide variety of embodiments and applications other than exactly as described herein. For example, various mounting means might be used, and the material support roll or pulley might be supported on each side rather than being cantilevered. Accordingly, it is to be understood that the embodiments of this invention herein shown and discussed are by way of illustration and not of limitation, and that a wide variety of embodiments may be made without departing from the spirit or scope of this invention.

Further, it is within the contemplation of this invention that embodiments may be used in combination with other devices. For example, the embodiment herein discussed may have its support means 17 interconnected with a servo mechanism, as by a chain or lever arm so that a feed-back system may be actuated to cause the pay-off material from the supply package to increase in response to the amount of slack decreasing.

I claim:

1. A device for compensating for slack variations in a moving continuum of material without inducing tensional variations in said material significantly beyond pre-determined limits, comprising a material contact element adapted for having a portion of the surface thereof contacted by a contiuum of material immediately after said material has traveled along a first travel path, said first travel path being at an angle of less than 180° with respect to the path traveled by said material as it moves away from contact with said element, said element being circular in cross-section and rotatably mounted upon one end of a shaft which extends out from, and the opposite end of which is affixed to, a support means for supporting said shaft, said support means comprising parallel, spaced-apart bushings, the axes of which are normal to said shaft, a support frame comprising parallel shafts, each of which moveably resides in a different one of said bushings by which support frame said support means is supported in linearly moveable relationship thereto in a direction normal to the axis of said shaft, said support frame being positioned at an incline with respect to horizontal, so that the ability of said support means to move down said incline in response to gravitational forces is dependent upon increased slack in said material where it contacts said element.

2. The device described in claim 1 wherein said contact element is a roller.

3. The device described in any of claims 1, or 2 wherein said support frame is selectively, fixedly inclineable by means of a pivotal support at one end and releasable holding means at the other end.

* * * * *